(12) United States Patent
Ito et al.

(10) Patent No.: US 6,472,829 B2
(45) Date of Patent: Oct. 29, 2002

(54) DISCHARGE LAMP LIGHTING CIRCUIT

(75) Inventors: Masayasu Ito, Shizuoka (JP); Hitoshi Takeda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/870,035

(22) Filed: May 30, 2001

(65) Prior Publication Data

US 2002/0047640 A1 Apr. 25, 2002

(30) Foreign Application Priority Data

Jun. 20, 2000 (JP) ........................................ 2000-184112

(51) Int. Cl.$^7$ ............................................. H05B 39/04
(52) U.S. Cl. ........................................ 315/307; 315/291
(58) Field of Search .......................... 315/86, 224, 225, 315/291, 297, 307

(56) References Cited

U.S. PATENT DOCUMENTS

| | | | |
|---|---|---|---|
| 4,700,111 A | * 10/1987 | Folwell et al. | 315/200 |
| 5,278,452 A | * 1/1994 | Matsumoto et al. | 307/10.8 |
| 5,663,613 A | * 9/1997 | Yamashita et al. | 315/308 |
| 5,783,908 A | 7/1998 | Toda et al. | |
| 5,907,224 A | * 5/1999 | Yamashita et al. | 315/308 |
| 5,914,566 A | * 6/1999 | Matsumoto et al. | 315/82 |
| 5,973,457 A | * 10/1999 | Yamashita et al. | 315/225 |
| 6,275,018 B1 | * 8/2001 | Telefus et al. | 323/282 |

* cited by examiner

*Primary Examiner*—Don Wong
*Assistant Examiner*—Minh D A
(74) *Attorney, Agent, or Firm*—Fish & Richardson P.C.

(57) ABSTRACT

In a discharge lamp lighting circuit, there are provided a DC power supply portion for receiving a supply voltage from a DC power supply though an overcurrent protecting means, a DC-AC converter portion for converting an output voltage of the DC power supply portion into an AC voltage to supply the AC voltage to a discharge lamp, a starter circuit for starting the discharge lamp by applying a high voltage pulse to it, and a control circuit for detecting at least one of a voltage applied to the discharge lamp or to decide whether or not a failure occurs in a lighting state of the discharge lamp. Thus, a voltage is obtained from at least one of a position that is located between the DC power supply and the overcurrent protecting means or from another DC power supply different from the DC power supply, and the obtain voltage is supplied to the control circuit as the power supply voltage.

7 Claims, 5 Drawing Sheets

DISCHARGE LAMP LIGHTING CIRCUIT

BACKGROUND OF THE INVENTION

The present invention relates to a technology to adopt a sufficient measure for safety by assuring the supply voltage to the control circuit even when the supply of the power supply voltage to the discharge lamp or the lighting circuit is cut off because of the operation of the overcurrent protecting means.

As the lighting circuit for the discharge lamp (the metal halide lamp, etc.), the configuration having the DC power supply circuit, the DC-AC converter circuit, and the starting circuit (so-called starter circuit) is well known.

FIG. 8 shows a circuit configuration 50 of the discharge lamp lighting circuit according to the prior art. The power is supplied from the DC power supply 52 to the lighting circuit 51 via the overcurrent protecting element c and the lighting switch 55.

In order to control the power supply to the discharge lamp f connected to the output terminal of the lighting circuit 51, the control circuit 57 is provided. As the power supply voltage supplied to the circuit, the DC voltage that is obtained from the DC power supply 52 via the overcurrent protecting element 53 and the lighting switch d may be employed as it is, or may be generated by the power supply circuit 54 based on the DC voltage.

By the way, in the event that the lighting of the discharge lamp become failure or the input voltage to the lighting circuit has the abnormal value, if the power supply voltage enough to operate the control circuit can be always assured, the injury upon the human body because of the high voltage can be prevented or bad effects such as the smoke the ignition, etc, due to the excessive output of the power can be prevented previously since the operation of the lighting circuit can be stopped at the time of failure.

However, in the circuit of the prior art, if the supply of the power from the DC power supply 52 is cut off because of the operation of the overcurrent protecting element 53, the supply of the power to the control circuit 57 is also stopped. Therefore, there is the problem that it is also impossible to adopt a sufficient measure for safety (e.g., lighting of the alternative light source, information of the failure occurrence, etc.).

SUMMARY OF THE INVENTION

Therefore, it is an object of the present invention to adopt a sufficient measure for safety by assuring the supply voltage to the control system circuit even when the supply of the power supply voltage to the discharge lamp or the lighting circuit is cut off due to the operation of the overcurrent protecting means.

In order to overcome the above subject, in the present invention, there is provided a discharge lamp lighting circuit comprising a DC power supply portion for receiving a supply voltage from a DC power supply via an overcurrent protecting means as an input voltage and converting the input voltage into a desired DC voltage; a DC-AC converter portion for converting an output voltage of the DC power supply portion into an AC voltage to supply the AC voltage to a discharge lamp; a starter circuit for starting the discharge lamp by applying a high voltage pulse to it; and a control circuit for detecting a voltage applied to the discharge lamp or a current flowing through the discharge lamp or detecting further the input voltage to control a supply power to the discharge lamp or to decide whether or not a failure occurs in a lighting state of the discharge lamp or in the input voltage; wherein a voltage obtained from a position that is located closer to the DC power supply than the overcurrent protecting means or a voltage generated based on such voltage, or a voltage supplied from another system different from the DC power supply or a voltage generated based on such voltage is supplied to the control circuit as the power supply voltage.

Therefore, according to the present invention, the situation that the power cannot be supplied to the discharge lamp because of the operation of the overcurrent protecting means is brought about, the power supply voltage to the control circuit can be obtained by the voltage obtained from the position that is located closer to the DC power supply than the overcurrent protecting means or the voltage supplied from another system different from the DC power supply.

DETAILED DESCRIPTION OF THE PREFERRED EMBODIMENTS

Figure 1:
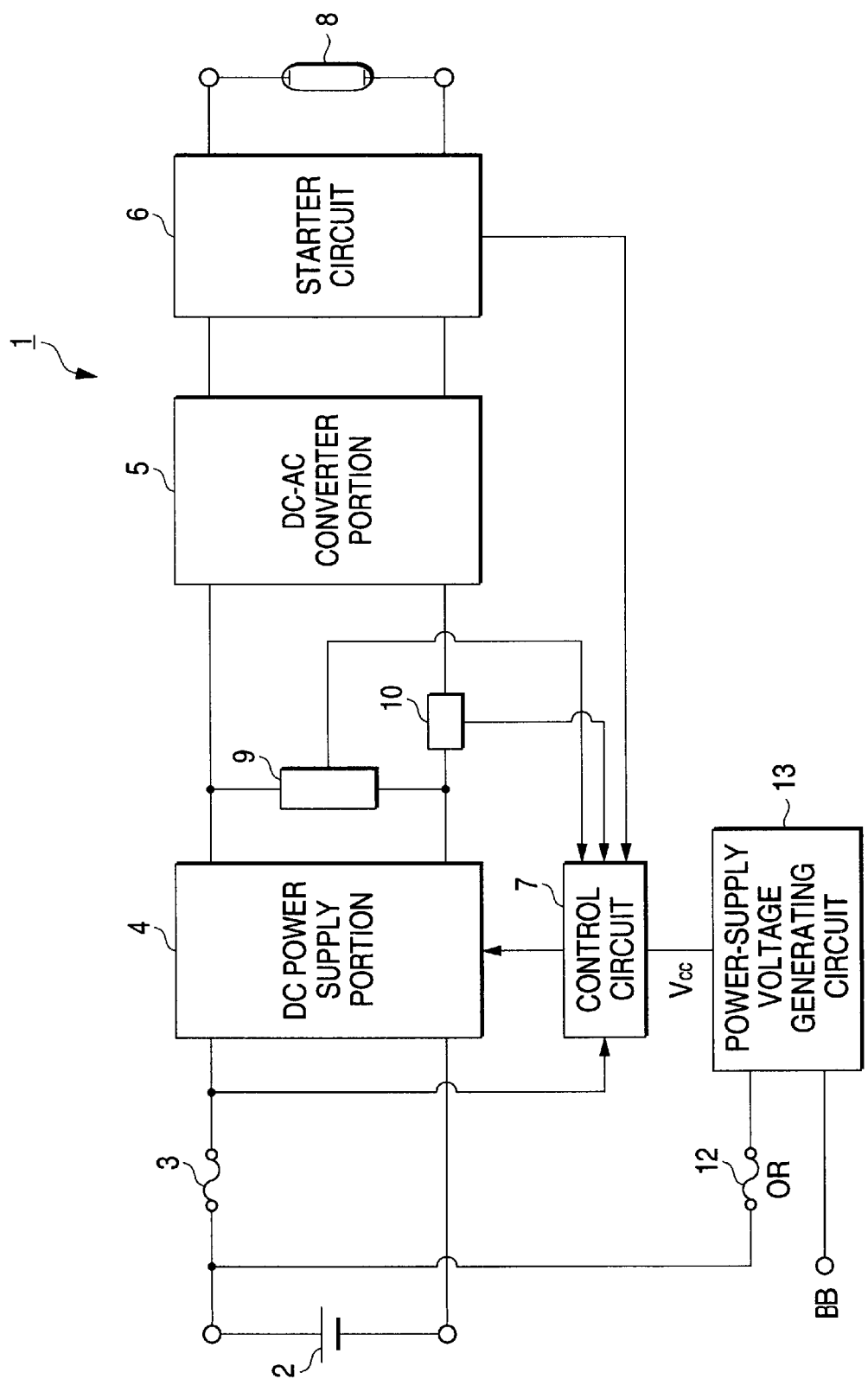
FIG. 1 is a block circuit diagram showing a basic configuration of a discharge lamp lighting circuit according to the present invention.

FIG. 1 shows a basic configuration of a discharge lamp lighting circuit 1 according to the present invention.

The discharge lamp lighting circuit 1 comprises a DC power supply 2; overcurrent protecting means 3; a DC power supply portion 4; a DC-AC converter portion 5; a starter circuit 6; and a control circuit 7.

In this circuit, the DC power supply portion 4 is constructed to receive the supply of power from the DC power supply 2 via the overcurrent protecting means 3. That is, the voltage supplied from the DC power supply 2 via the overcurrent protecting means 3 (the overcurrent protecting element such as the fuse, etc., or the braker, etc.) is supplied to the DC power supply portion 4 as the input voltage. The DC power supply portion 4 converts the input voltage into a desired DC voltage in response to a control signal from the control circuit 7 and then outputs the DC voltage. For example, the DC-DC converter (fly-back type, chopper type, etc.) having a configuration of the switching regulator is employed.

The DC-AC converter portion 5 is provided to convert the output voltage of the DC power supply portion 4 into the AC voltage and then apply this AC voltage to the discharge lamp. For example, there may be listed the bridge-type circuit configuration using plural pairs of semiconductor switching elements, the DC-DC converter using the converter transformer, or the like. So far as the present invention is concerned, any configuration may be employed and also any waveform such as the sinusoidal wave, the rectangular wave, etc. may be employed as the AC voltage waveform supplied to the discharge lamp 8.

The starter circuit 6 is provided to start the discharge lamp 8 by applying the high voltage pulse. This high voltage pulse is generated at a predetermined timing at a point of time when the power supply for the discharge lamp 8 is turned ON, then is superposed on the output voltage from the DC-AC converter portion 5, and then is applied to the discharge lamp 8.

The control circuit 7 has any one function or both functions described in the following.

(A) A function for detecting the voltage applied to the discharge lamp or the current flowing through the discharge lamp or a signal corresponding to them to control the supply power to the discharge lamp, and deciding whether or not the failure occurs in the lighting state of the discharge lamp.

(B) A function for detecting the input voltage to the DC power supply portion to decide whether or not the failure occurs in the input voltage.

That is, first the function (A) is needed to ensure that the power supply to the discharge lamp 8 is executed normally. For example, if the PWM (pulse-width modulation) system is employed to control the DC-DC converter constituting the DC power supply portion 4, the output of the DC power supply portion 4 is controlled by generating a control signal whose duty cycle is changed in answer to the voltage or current detection signal of the discharge lamp 8, and then supplying this control signal the DC-DC converter (the switching element of the DC-DC converter)

Also, a role of the control circuit 7 is to detect the failure in the lighting state of the discharge lamp 8, e.g., the discharge lamp 8 is brought into the inoperable state because the current flowing through it is reduced abnormally, or to detect the overcurrent of the DC power supply portion 4, the operation stop of the DC-AC converter portion 5, etc. That is, the abnormality detection process or the abnormal state decision process is contained in the functional range of the control circuit 7.

The voltage or current detection of the discharge lamp 8 can be achieved by providing a voltage detecting portion 9 (voltage-dividing resistance, etc.) or a current detecting portion 10 (voltage-converting shunt resistance, etc.) to the output stage of the DC power supply portion 4.

The function (B) is a function for deciding the failure of the input voltage to the DC power supply portion 4, e.g., the event that the magnitude of the input voltage is decreased lower than the tolerance, or increased excessively high, etc. Thus, this function (B) is needed to protect the discharge lamp and the lighting circuit from the harmful influence caused by the change in the power supply voltage.

Meanwhile, if the overcurrent protecting means 3 operates since the current flowing through the lighting circuit is increased excessively, the power is not supplied to the DC power supply portion 4 and subsequent circuits, and also the discharge lamp 8. For example, if the fuse is employed as the overcurrent protecting means 3, the DC power supply input is cut off in the situation that the DC input current is increased to melt away the fuse (the failure of the DC-DC converter, etc.), and thus the lighting circuit is not operated.

However, in the application to the vehicle light source, it is not preferable selection with regard to the vehicle running safety to leave the inoperable state of the discharge lamp 8 as it is. It is desired that the driver should be informed of the event that any failure occurs in the lighting of the discharge lamp 8, or it is desired to take a measure such as the turning-ON of the alternative light source, etc.

For this reason, the power supply for the control circuit 7 must be assured even when the overcurrent protecting means 3 is operated. Thus, the present invention adopts modes described in the following.

(I) A mode in which the voltage obtained from the position that is located closer to the DC power supply 2 than the overcurrent protecting means 3 or a voltage generated based on such voltage is supplied to the control circuit 7 as the power supply voltage.

(II) A mode in which a voltage supplied from another system different from the DC power supply 2 or a voltage generated based on such voltage is supplied to the control circuit 7 as the power supply voltage.

First, in the mode (I), such a configuration may be considered that the supply voltage supplied from the DC power supply 2 via the first overcurrent protecting means 3 is supplied to the DC power supply portion 4 constituting the lighting circuit, and also the supply voltage supplied from the DC power supply 2 via a second overcurrent protecting means 12 or the voltage generated based on such voltage is supplied to the control circuit 7 as the power supply voltage.

Figure 2:
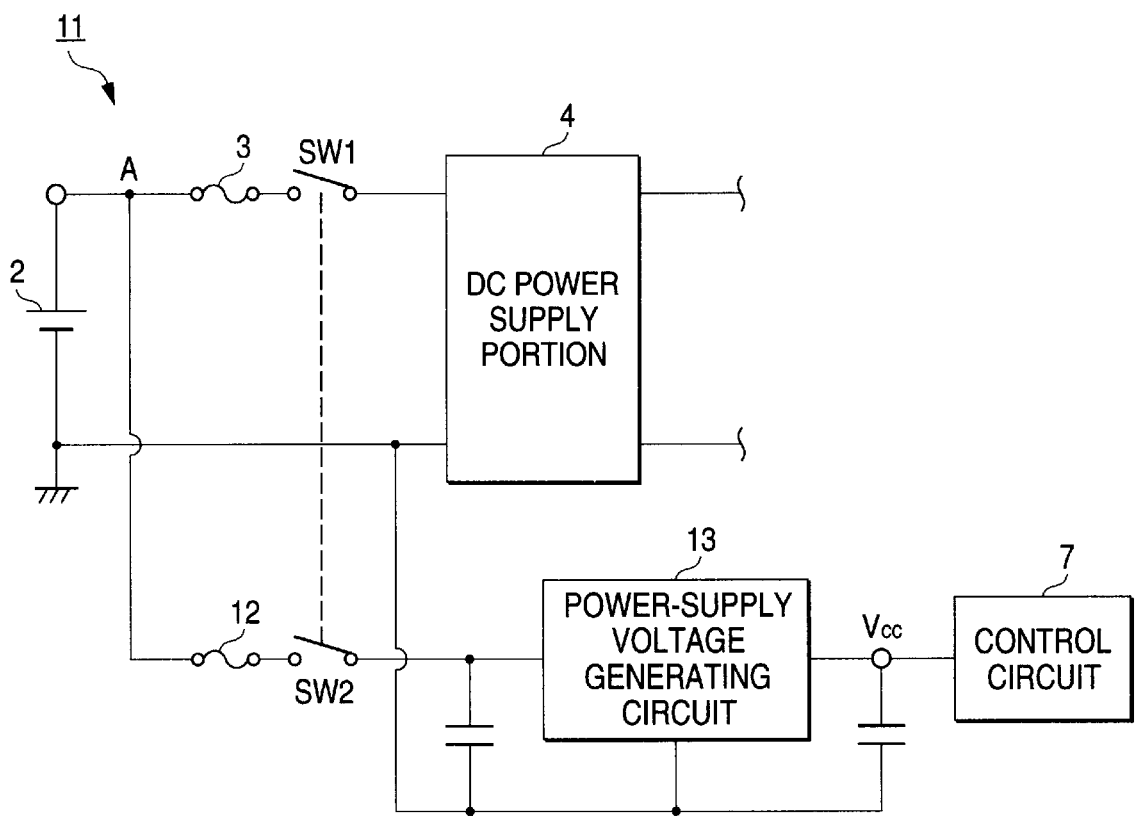
FIG. 2 is a block circuit diagram showing a pertinent portion of the basic configuration shown in FIG. 1.

FIG. 2 shows a pertinent portion of such configuration 11.

As shown in FIG. 2, the power supply voltage is supplied to the DC power supply portion 4 of the lighting circuit from the DC power supply 2 via the first overcurrent protecting means 3 and a first switch element SW1, and also the power supply voltage is supplied to the power-supply voltage generating circuit 13 from the DC power supply 2 via a branch point "A" (a connection point between the DC power supply 2 and the first overcurrent protecting means 3), the second overcurrent protecting means 12 and a second switch element SW2.

In this case, there is such a mode that the power supply voltage supplied via the second overcurrent protecting means 12 and the second switch element SW2 is supplied to the control circuit 7 as it is. In this example, a voltage (referred to as a "Vcc" hereinafter) generated by the power-supply voltage generating circuit 13 is supplied to the control circuit 7. The first switch element SW1 arranged on a current path from the DC power supply 2 to the DC power supply portion 4 and the second switch element SW2 arranged on a current path to the control circuit 7 are opened/closed in synchronism with each other. These switch elements SW1, SW2 are closed when the discharge lamp 8 is turned ON.

Figure 4:
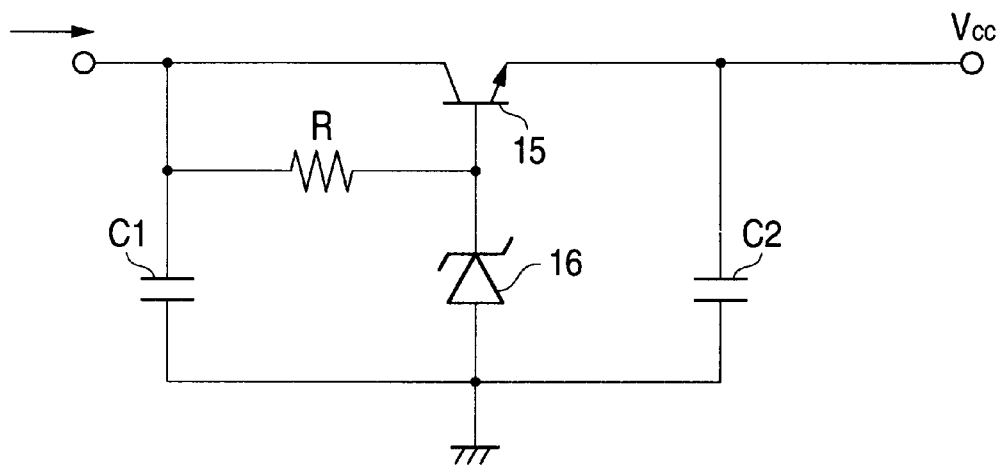
FIG. 4 is a block circuit diagram showing an example of a configuration of the power-supply voltage generating circuit using a series regulator.
Figure 5:
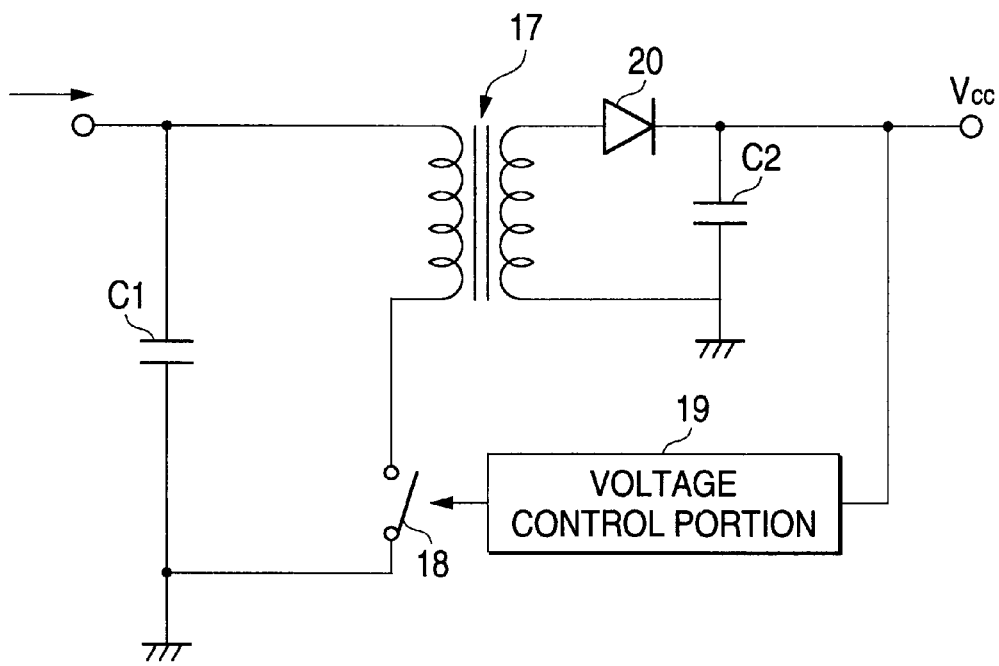
FIG. 5 is a block circuit diagram showing an example of a configuration of the power-supply voltage generating circuit using a switching regulator.

As the configuration of the power-supply voltage generating circuit 13, examples described in the following are listed, for example. But any configuration and method may be employed to generate the voltage.

a configuration of a three-terminal regulator (see FIG. 3)
    a configuration of a series regulator (see FIG. 4)
    a configuration of a switching regulator (see FIG. 5)

Figure 3:
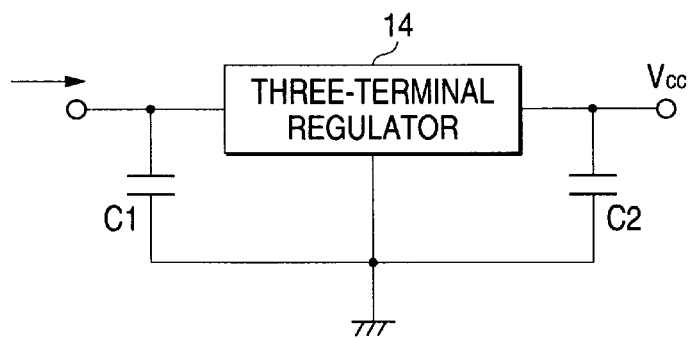
FIG. 3 is a block circuit diagram showing an example of a power-supply voltage generating circuit using a three-terminal regulator.

In FIG. 3, the power-supply voltage generating circuit 13 consists of a three-terminal regulator IC 14 and capacitors C1, C2 connected to an input terminal and an output terminal of the three-terminal regulator 14 respectively. In FIG. 4, an example of the power-supply voltage generating circuit 13 using a series regulator consisting of an NPN transistor 15, a Zener diode 16, capacitors C1, C2, and a resistor R is shown. In FIG. 5, an example of the power-supply voltage generating circuit 13 using a fly-back switching regulator consisting of a transformer 17, a capacitor C1 and a,switching element 18 (indicated simply by a symbol of the switch in FIG. 5) provided to the primary side of the transformer 17, a voltage control portion 19 for operating the switching element 18 to stabilize the output voltage, and a diode 20 and a capacitor C2 provided to the secondary side of the transformer 17 is shown.

However, in the circuit shown in FIG. 2, it can be understood that, even if the situation that the power supply voltage cannot be supplied to the DC power supply portion 4 of the lighting circuit because of the operation of the first overcurrent protecting means 3 is brought about, the power supply voltage can be supplied to the control circuit 7 inasmuch as the second overcurrent protecting means 12 is not cut off, and thus the operation of the control circuit 7 can be guaranteed.

Then, in the mode (II), even when the first overcurrent protecting means 3 is operated, the supply of the power supply voltage can be assured by supplying the voltage supplied from another system different from the DC power supply 2 in the lighting circuit or the voltage generated based on such voltage to the control circuit 7.

Figure 6:
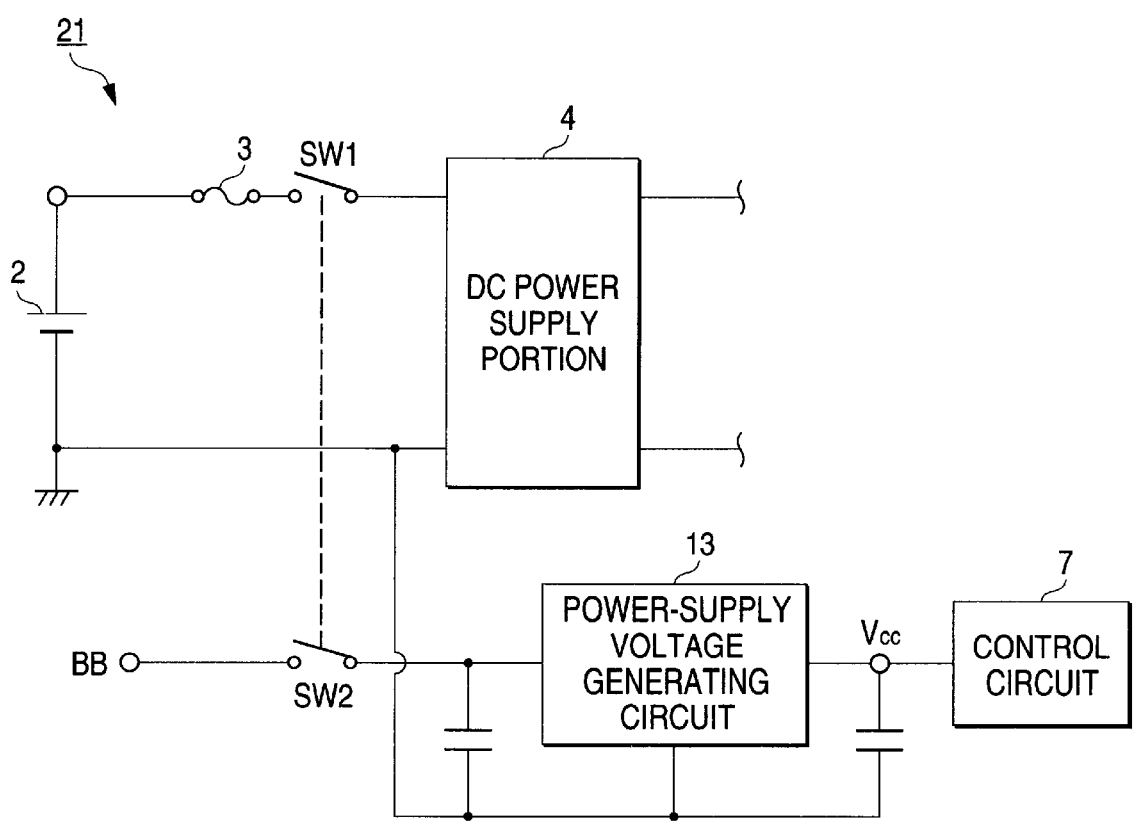
FIG. 6 is a block circuit diagram showing a pertinent portion of a configuration for supplying a power supply voltage from another system power-supply to a control circuit.

FIG. 6 shows a pertinent portion of such configuration 21.

As shown in FIG. 6, the lighting circuit is constructed such that the power supply voltage is supplied to the DC power supply portion 4 of the lighting circuit from the DC power supply 2 via the overcurrent protecting means 3 and the switching element SW1. The current supply path to the control circuit 7 is provides as another system different from the current supply path to the lighting circuit.

That is, another system power supply voltage (for example, in the case of the car, the ignition voltage, or the like is employed, and this is referred to as "BB" hereinafter) is supplied to the power-supply voltage generating circuit 13 via the switching element SW2.

As mentioned above, the first switch element SW1 and the second switch element SW2 are opened/closed in synchronism with each other.

However, in this circuit, it can be understood that, even if the situation that the power supply voltage cannot be supplied to the DC power supply portion 4 of the lighting circuit because of the operation of the first overcurrent protecting means 3 is brought about, the operation of the control circuit 7 can be guaranteed inasmuch as the power supply voltage is supplied to the control circuit 7 based on the power supply voltage BB.

In the circuit explained above, if the power supply to the discharge lamp 8 is cut off by the operation of the first overcurrent protecting means 3 provided on the current supply path from the DC power supply 2 to the DC power supply portion 4, preferable items performed by the control circuit 7 to guarantee the vehicle running safety may be listed in the following.

(i) To turn ON an auxiliary light source as the alternative of the discharge lamp by sending out the control signal from the control circuit to the lighting circuit of the auxiliary light source.

(ii) To inform the driver of the failure of the lighting of the discharge lamp by sending out a signal from the control circuit to a displaying means.

(iii) To employ (i) and (ii) in combination.

First, according to the item (i), when it is impossible to turn ON the discharge lamp because the power supply to the lighting circuit is cut off, the sufficient illumination light can be assured by immediately turning ON the auxiliary light source.

In the application to the vehicle lighting equipment, it is preferable from the viewpoint of the running safety to provide the auxiliary light sources in necessary number to respective discharge lamps as the alternative light source of the discharge lamp. However, since the problem remains from respects of the cost and the device arrangement space, the mode in which the discharge lamp is used as the head-lamp light source (the main (running) beam light source or the low (dipped) beam light source) and also light sources for auxiliary head lamps (the fog lamp, the clearance lamp, the cornering lamp, etc.) are used as the auxiliary light sources, the mode in which the other light source out of the main beam light source and the low beam light source is used as the auxiliary light source if one light source is used as the discharge lamp, or the like, for example, may be considered.

Then, according to the item (ii), if a display means (an indicator, etc.) can inform the driver of the event that the discharge lamp 8 cannot be turned ON, the driver's attention can be invited. In other words, if the discharge lamp 8 cannot be turned ON, the care to exchange the discharge lamp, repair the lighting circuit, or the like must be taken by informing the driver of the vehicle of the fact.

Figure 7:
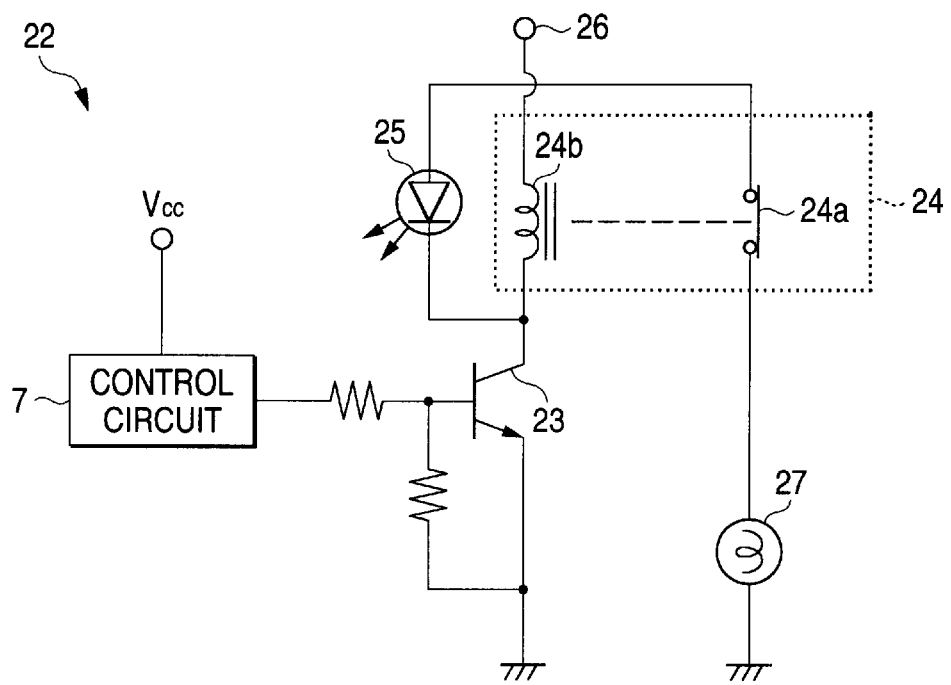
FIG. 7 is a block circuit diagram showing an example of a circuit configuration used to light an auxiliary light source and to inform the failure of a discharge lamp by using a light emitting element.
Figure 8:
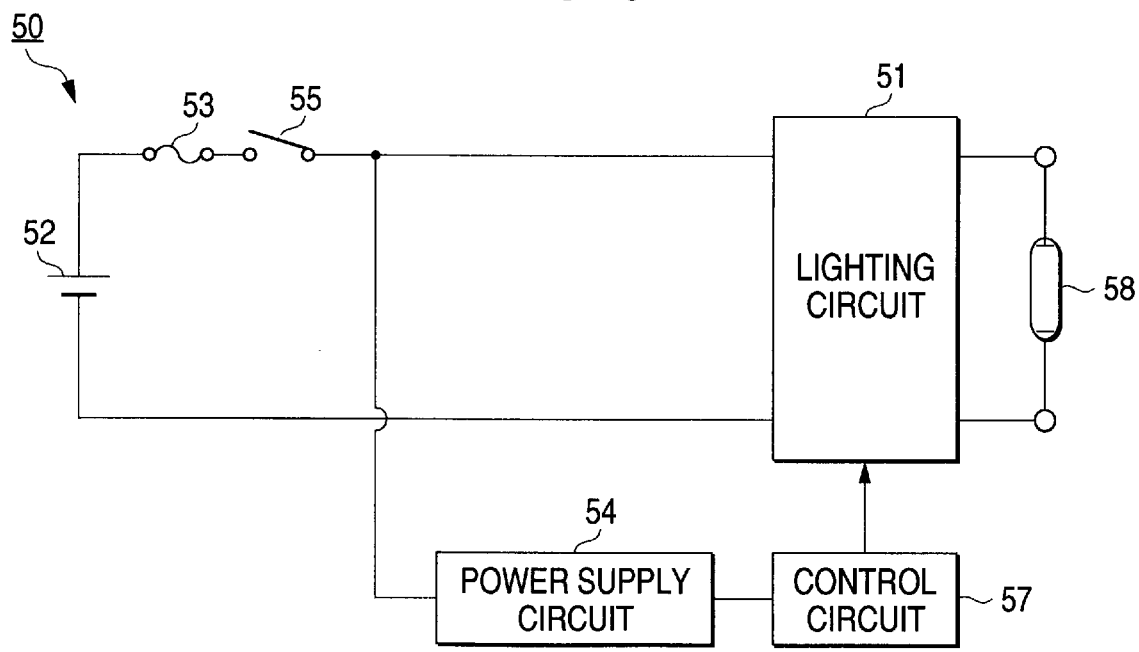
FIG. 8 is a block circuit diagram showing a circuit configuration of the discharge lamp lighting circuit in the prior art.

FIG. 7 shows an example of a circuit configuration 22 used to light the auxiliary light source when the discharge lamp cannot be turned ON.

If the inoperable state of the discharge lamp 8 is detected by the control circuit 7, an NPN transistor 23 is brought into its turn-ON state by the output signal. A coil 24b of an auxiliary light source lighting relay 24 and a light emitting element 25 (e.g., a light emitting diode, an incandescent lamp, etc.) are connected to a collector of the NPN transistor 23, and these are connected in parallel mutually to receive a predetermined voltage (another system voltage different from the supply voltage to the DC power supply portion 4, for example, the input voltage of the power-supply voltage generating circuit 13 in FIG. 2) from a power supply terminal 26. Therefore, if the relay 24 is operated by turning ON the NPN transistor 23 to close a contact 24a, an auxiliary light source 27 is turned ON and simultaneously the light emitting element 25 is lightened. Since the light emitting element 25 constitutes the indicator to inform the driver of the failure of the discharge lamp, the driver can recognize immediately that the auxiliary light source 27 is turned ON due to generation of the failure when he or she knows this failure.

As to the method of detecting the inoperable state of the discharge lamp, its detailed explanation will be omitted since various methods such as the method of detecting whether or not these values are within an allowable range by monitoring the voltage value or the current value supplied to the discharge lamp, the method of detecting the operation stop of the circuit, the method of detect whether or not the DC input voltage is within an allowable range by comparing the input voltage with a threshold value, etc. have been known up to now and in addition any detecting method may be employed in the present invention.

Also, in the configuration shown in FIG. 7, the relay coil and the light emitting element are driven by one transistor. But various embodiments may be thought of such that separate driving transistors may be provided respectively, the circuit to flash the light emitting element, the alarm sound generating circuit, etc. may be used in combination, and others.

According to the combination of (i) and (ii) shown above as (iii), if the alternative light source is turned ON immediately after the discharge lamp cannot be turned ON, there is the possibility that it is difficult for the driver to know the generation of the failure. Then, if the driver fails resultantly to execute the treatment such as the repair, the exchange, etc., disadvantages described in the following, for example, are apprehensive.

Since no alternative lighting means remains completely when the auxiliary light source is not turned ON, the driver is caused to drive in the dark at night and exposed to danger.

If the state that the driver is not aware of the failure is continued for a long term, the increased in the load to the power supply due to the wasteful power consumption, and the risk such as the electric shock, etc. become the issue.

Therefore, if the item (i) is employed, the effectiveness to inform the driver by the item (ii) is increased further.

As apparent from the above description, according to the invention, even if the situation that the power supply voltage cannot be supplied to the discharge lamp because of the operation of the overcurrent protecting means is brought about, the voltage obtained from the position that is located closer to the DC power supply than the overcurrent protecting means or a voltage generated based on such voltage is supplied to the control circuit as the power supply voltage.

Further, according to the invention, since the supply voltage supplied from the DC power supply via the second overcurrent protecting means or the voltage generated based on such voltage can be supplied to the control circuit, the operation of the control circuit can be guaranteed inasmuch as the power supply to the control circuit is not cut off by the second overcurrent protecting means.

Further, according to the invention, since the first switch element and the second switch element are opened/closed in synchronism with each other, the harmful influences (unstability of the circuit operation, etc.) due to the discrepancy of ON/OFF timings between these switch elements can be prevented.

Furthremore, according to the invention, if the power supply to the discharge lamp is cut off by the overcurrent protecting means, the necessary light quantity can be assured by turning ON the auxiliary light source as the alternative of the discharge lamp.

Furthermore, according to the invention, if the power supply to the discharge lamp is cut off by the overcurrent protecting means, the care to exchange the discharge lamp, repair the lighting circuit, or the like can be accelerated by informing that the failure occurs in the lighting of the discharge lamp.

What is claimed is:

1. A discharge lamp lighting circuit comprising:
    a DC power supply portion for receiving a supply voltage from a DC power supply through a first overcurrent protecting means as an input voltage and converting the input voltage into a desired DC voltage;
    a DC-AC converter portion for converting an output voltage of the DC power supply portion into an AC voltage to supply the AC voltage to a discharge lamp;
    a starter circuit for starting the discharge lamp by applying a high voltage pulse to the discharge lamp; and
    a control circuit for detecting at least one of a voltage applied to the discharge lamp or a current flowing through the discharge lamp or the input voltage to control a supply power to the discharge lamp to decide whether or not a failure occurs in a lighting state of the discharge lamp, or the input voltage to the DC power supply portion to decide whether or not a failure occurs in the input voltage;
    wherein a voltage is obtained from at least one of a position that is located between the DC power supply and the overcurrent protecting means, or from another DC power supply different from the DC power supply, and wherein the obtained voltage is supplied to said control circuit as a power supply voltage.

2. The discharge lamp lighting circuit according to claim 1, further comprising: a second overcurrent protecting means for supplying a voltage supplied from the DC power supply to said control circuit as the power supply voltage.

3. The discharge lamp lighting circuit according to claim 1, further comprising:
    a first switch element arranged on a current path from the DC power supply to the DC power supply portion; and
    a second switch element arranged on a current path to the control circuit,
    wherein said first and second switch elements are operated in synchronism with each other.

4. The discharge lamp lighting circuit according to claim 2, further comprising:
    a first switch element arranged on a current path from the DC power supply to the DC power supply portion; and
    a second switch element arranged on a current path to the control circuit,
    wherein said first and second switch elements are operated in synchronism with each other.

5. The discharge lamp lighting circuit according to claim 1, wherein, if the power supply to the discharge lamp is cut off because of an operation of the first overcurrent protecting means provided on a current supply path from the DC power supply to the DC power supply portion, an auxiliary light source is turned ON as an alternative of the discharge lamp by sending out a control signal from the control circuit to a lighting circuit of the auxiliary light source.

6. The discharge lamp lighting circuit according to claim 1, wherein, if the power supply to the discharge lamp is cut off because of an operation of the first overcurrent protecting means provided on a current supply path from the DC power supply to the DC power supply portion, a user is informed of a failure in lighting of the discharge lamp by sending out a signal from the control circuit to a displaying means.

7. The discharge lamp lighting circuit according to claim 1, wherein said voltage supplied from another DC power supply different from the DC power supply is an ignition voltage of a car.

* * * * *